US012774226B2

(12) United States Patent
Cho et al.

(10) Patent No.: US 12,774,226 B2

(45) Date of Patent: Oct. 27, 2026

(54) SYSTEM AND METHOD FOR FLUID TREATMENT WITH PLASMA DISCHARGES

(71) Applicant: Onvector LLC, King of Prussia, PA (US)

(72) Inventors: Daniel J. Cho, Elkins Park, PA (US); HyoungSup Kim, Brookhaven, PA (US); Russel R. McAvoy, Sharon, MA (US)

(73) Assignee: ONVECTOR LLC, King of Prussia, PA (US)

( * ) Notice: Subject to any disclaimer, the term of this patent is extended or adjusted under 35 U.S.C. 154(b) by 335 days.

(21) Appl. No.: 18/531,072

(22) Filed: Dec. 6, 2023

(65) Prior Publication Data

US 2024/0190727 A1 Jun. 13, 2024

Related U.S. Application Data

(60) Provisional application No. 63/386,535, filed on Dec. 8, 2022.

(51) Int. Cl.
*C02F 1/46* (2023.01)
*C02F 101/32* (2006.01)

(52) U.S. Cl.
CPC ........ *C02F 1/4608* (2013.01); *C02F 2101/32* (2013.01); *C02F 2201/46* (2013.01); *C02F 2301/04* (2013.01)

(58) Field of Classification Search
CPC ................ C02F 1/4608; C02F 2301/04; C02F 2201/46; C02F 2101/32
See application file for complete search history.

(56) References Cited

U.S. PATENT DOCUMENTS 11,027,990 B2 6/2021 Mededovic et al.
11,358,103 B2 6/2022 Phillips et al.
(Continued)

FOREIGN PATENT DOCUMENTS

CN 211570217 U * 9/2020 ................ C02F 1/72
WO WO-9535262 A1 * 12/1995 ................ C02F 1/52

OTHER PUBLICATIONS

CN 211570217U_English translation (Year: 2020).*
(Continued)

*Primary Examiner* — Youngsul Jeong
(74) *Attorney, Agent, or Firm* — Dentons Bingham Greenebaum LLP; Brian W. Chellgren

(57) ABSTRACT

A flow-through fluid treatment system for generating a plasma discharge in a fluid includes a high-voltage electrode forming a fluid inlet into a cylindrical flow-through reactor, the fluid inlet having an inlet inner diameter, a ground electrode forming a fluid outlet out of the cylindrical flow-through reactor, the ground electrode and the high-voltage electrode disposed coaxially across a gap between the electrodes in a cylindrical flow-through reactor space, a gas inlet into the cylindrical flow-through reactor, disposed tangentially in an interior wall of the cylindrical flow-through reactor to generate a vortex gas flow within the cylindrical flow-through reactor space, thereby generating a negative gauge pressure within the fluid inlet, and a high-voltage power supply electrically connected to the high-voltage electrode for generating a plasma discharge across the gap, thereby producing plasma treated fluid.

18 Claims, 6 Drawing Sheets

(56) References Cited

U.S. PATENT DOCUMENTS

| | | | | |
|---|---|---|---|---|
| 2020/0361797 | A1* | 11/2020 | Cho | C02F 1/4608 |
| 2022/0212959 | A1* | 7/2022 | Ganjigunte Ramaswamy | C02F 1/4608 |
| 2023/0212042 | A1* | 7/2023 | Chiang | C02F 1/283<br>210/668 |

OTHER PUBLICATIONS

Lewis et al., "Rapid degradation of PFAS in aqueous solutions by reverse vortex flow gliding arc plasma," submitted Nov. 26, 2019 for Environmental Science: Water Research & Technology, issue 4, Apr. 1, 2020, pp. 1044-1057.

Singh et al., "Breakdown Products from Perfluorinated Alkyl Substances (PFAS) Degradation in a Plasma-Based Water Treatment Process," Environ. Sci. Technol., vol. 53, pp. 2731-2738 (2019).

* cited by examiner

SYSTEM AND METHOD FOR FLUID TREATMENT WITH PLASMA DISCHARGES

CROSS-REFERENCE TO RELATED APPLICATIONS

This application claims the benefit of U.S. Provisional Application No. 63/386,535, filed Dec. 8, 2022, which is hereby incorporated by reference in its entirety.

BACKGROUND

Per- and poly-fluoroalkyl substances (PFAS) are a class of man-made amphophilic compounds (i.e., surfactants with a chemical structure that includes a hydrophilic "head" group and a fluorinated "tail") that have been used to manufacture consumer products and industrial chemicals, including, inter alia, aqueous film forming foams (AFFFs). AFFFs have been the product of choice for firefighting at military and municipal fire training sites around the world. AFFFs have also been used extensively at oil and gas refineries for both fire training and firefighting exercises. AFFFs work by blanketing spilled oil/fuel, cooling the surface, and preventing re-ignition. PFAS in AFFFs have contaminated the groundwater at many of these sites and refineries, including more than 100 U.S. Air Force sites.

PFAS are very difficult to treat largely because they are extremely stable compounds which include carbon-fluorine bonds. Carbon-fluorine (C—F) bonds are among the strongest known bonds in nature and are highly resistant to breakdown.

Due to PFAS contamination in groundwater, surface water, agriculture, and drinking water and their associated health risks, there has been a great focus on developing practical and effective water treatment technologies. Treatment technologies developed so far have included adsorptive and destructive methods. Some PFAS can associate strongly to proteins through either electrostatic or non-electrostatic (hydrophobic/hydrophilic) physisorption as well as site specific chemisorption. Based off these properties, adsorptive methods have been developed to remove these specific compounds from water, but are not effective for all PFAS compounds. Adsorptive methods to date include granular activated carbon (GAC), ion exchange (IX), polymers, and protein addition. These methods show promise in effectively removing some of the compounds from contaminated water, but do not destroy the PFAS compound, leading to the generation of PFAS contaminated residues and concentrates.

Due to the recalcitrant nature of PFAS and the C—F bond, destructive methods development has come with difficulties. Destructive methods of PFAS in contaminated water that have been studied for their treatment ability include sonolysis, thermal degradation, photocatalytic ozonation, electrochemical oxidation, persulfate, alkaline hydrothermal treatment, microwave/persulfate, UV, ionizing radiation electron beam, gamma-irradiation, boron-doped diamond film electrode oxidation, electrical discharge plasma, and biodegradation. Novel reductive processes such as photogenerated hydrated electrons ($e^-_{aq}$) are also being developed as a treatment technology. The methods described above have been demonstrated to be effective in degradation and lead to varying degrees of destruction involving reduction in chain length, cleaving of the C—F bond, and removal of the head group.

A promising treatment technology, non-equilibrium plasma discharge, is not in thermodynamic equilibrium and only the electron temperature is much hotter than the rest of the gas. Non-equilibrium plasma can generate a reactive environment of heat, ultraviolet (UV) radiation, and highly reactive chemical species such as electrons, ions, and reactive neutral species. At the gas-liquid interface, non-equilibrium plasma generates diverse reactive environments containing a variety of reactive chemical species like reactive oxygen species (ROS, such as $^1O_2$, $H_2O_2$, $O_3$, etc.), reactive nitrogen species (RNS, such as peroxynitrite, $ONOO^-$, and peroxynitrate, $ONOOO^-$), radicals ($H^-$, $O^-$, $OH^-$, $NO^-$, $NO_2^-$), as well as hydrated electrons ($e^-_{aq}$). These reactive species are responsible for targeting anything dissolved or suspended, including contaminants in the water and potentially degrading them in the plasma water treatment system. Plasma water treatment applications include a multitude of different discharge types, such as pulsed corona/streamer/spark discharge, DC pulseless corona discharge, dielectric barrier discharge, gliding arc discharge, DC glow discharge, and DC arc discharge, all leading to different reactive environments with different treatment potentials.

A recently developed enhanced contact plasma reactor for the destruction of PFAS featured a high-voltage electrode in the gas, just above the liquid surface, and a grounded ring electrode submerged just beneath the liquid surface to achieve contact between plasma streamers and the entire reactor volume. Plasma was formed by applying a sufficiently high electrical potential between the high-voltage and grounded electrodes via an external plasma-generating network. Argon gas was pumped through submerged diffusers to produce bubbles and form a layer of foam on the liquid surface. This foam concentrated surfactant-like contaminants (e.g., PFAS) and enhanced the contact between the liquid and the plasma, exposing the contaminant at the gas-liquid interface to reactive oxidative and reductive species in the plasma. See Singh et al., Environ. Sci. Technol., vol. 53, pp. 2731-2738 (2019). The amount of processed liquid was limited by the reactor volume, however, to a static volume of a few liters.

When any PFAS destruction method is applied to a large volume (e. g., 1 gallon or more) of water, such as municipal drinking water, the treatment method must be robust enough to break down the carbon-fluorine bond, and achieve a low target contaminant concentration, on the order of nanograms per liter in the resulting treated water.

Therefore, there is a need for a high-throughput fluid treatment system for generating a plasma discharge in a fluid that concentrates surfactant-like contaminants.

SUMMARY

Various embodiments disclosed herein relate to methods and apparatus for fluid treatment with plasma discharges. In accordance with one or more embodiments, a flow-through fluid treatment system for generating a plasma discharge in a fluid includes a high-voltage electrode forming a fluid inlet into a cylindrical flow-through reactor, the fluid inlet having an inlet inner diameter, a ground electrode forming a fluid outlet out of the cylindrical flow-through reactor, the ground electrode and the high-voltage electrode disposed coaxially across a gap between the electrodes in a cylindrical flow-through reactor space. The fluid treatment system further includes a gas inlet into the cylindrical flow-through reactor, disposed tangentially in an interior wall of the cylindrical flow-through reactor to generate a vortex gas flow within the cylindrical flow-through reactor space, thereby generating a negative gauge pressure within the fluid inlet, and a high-voltage power supply electrically connected to the high-voltage electrode for generating a plasma discharge across the gap, thereby producing plasma treated fluid. In some embodiments, the fluid outlet can have an outlet inner diameter that is larger than the inlet inner diameter. In certain embodiments, the gap can be in a range of between about 1 mm and about 8 mm. In some embodiments, the fluid can be a foam. In some of these embodiments, the flow-through fluid treatment system can further include a foam fractionation system in fluid communication with the fluid inlet. In certain of these embodiments, the foam, that is, the foamy fluid processed by the foam fractionation-based water treatment system, can comprise amphophilic compounds, such as per- and poly-fluoroalkyl substances (PFAS). In some embodiments, the fluid can be a liquid. In certain of these embodiments, the liquid can include a surfactant.

In accordance with one or more embodiments, a method of plasma treating fluid includes flowing a fluid through a fluid inlet having an inlet inner diameter into a cylindrical flow-through reactor, the fluid inlet forming a high-voltage electrode, flowing the fluid out of a fluid outlet, the fluid outlet forming a ground electrode disposed coaxially across a gap between the electrodes in a cylindrical flow-through reactor space. The method further includes flowing a gas through a gas inlet into the cylindrical flow-through reactor tangentially along an interior wall of the cylindrical flow-through reactor, thereby generating a vortex gas flow within the cylindrical flow-through reactor space and a negative gauge pressure within the fluid inlet, and generating a plasma discharge across the gap, thereby producing plasma treated fluid. In certain embodiments, the fluid outlet can have an outlet inner diameter that is larger than the inlet inner diameter. In some embodiments, the gap can be in a range of between about 1 mm and about 8 mm. In certain embodiments, the fluid can be a foam that is drawn into the cylindrical flow-through reactor by the negative pressure within the fluid inlet. In some of these embodiments, the method can further include flowing the fluid through a foam fractionation system in fluid communication with the fluid inlet. In certain of these embodiments, the foam can comprise amphophilic compounds, such as per- and poly-fluoroalkyl substances (PFAS). In some embodiments, the fluid can be a liquid. In certain of these embodiments, the liquid can include a surfactant.

The water treatment systems and methods described herein have many advantages, including enabling a high-throughput fluid treatment system for generating a plasma discharge in a fluid with concentrated surfactant-like contaminants.

BRIEF DESCRIPTION OF THE DRAWINGS

The foregoing purposes and features, as well as other purposes and features, will become apparent with reference to the description and accompanying figures below, which are included to provide an understanding of the invention and constitute a part of the specification, in which like numerals represent like elements. The figures are not necessarily drawn to scale, emphasis instead being placed upon illustrating embodiments.

DETAILED DESCRIPTION

It is to be understood that the figures and descriptions of the present invention have been simplified to illustrate elements that are relevant for a clearer comprehension of the present invention, while eliminating, for the purpose of clarity, many other elements found in systems and methods of plasma discharge in fluid. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are described.

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of ±20%, ±10%, ±5%, ±1%, and ±0.1% from the specified value, as such variations are appropriate.

"HV" as used herein means high-voltage, such as a voltage in excess of 1,000 V.

Ranges: throughout this disclosure, various aspects of the invention can be presented in a range format. It should be understood that the description in range format is merely for convenience and brevity and should not be construed as an inflexible limitation on the scope of the invention. Where appropriate, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6, etc., as well as individual numbers within that range, for example, 1, 2, 2.7, 3, 4, 5, 5.3, and 6. This applies regardless of the breadth of the range.

Figure 1A:
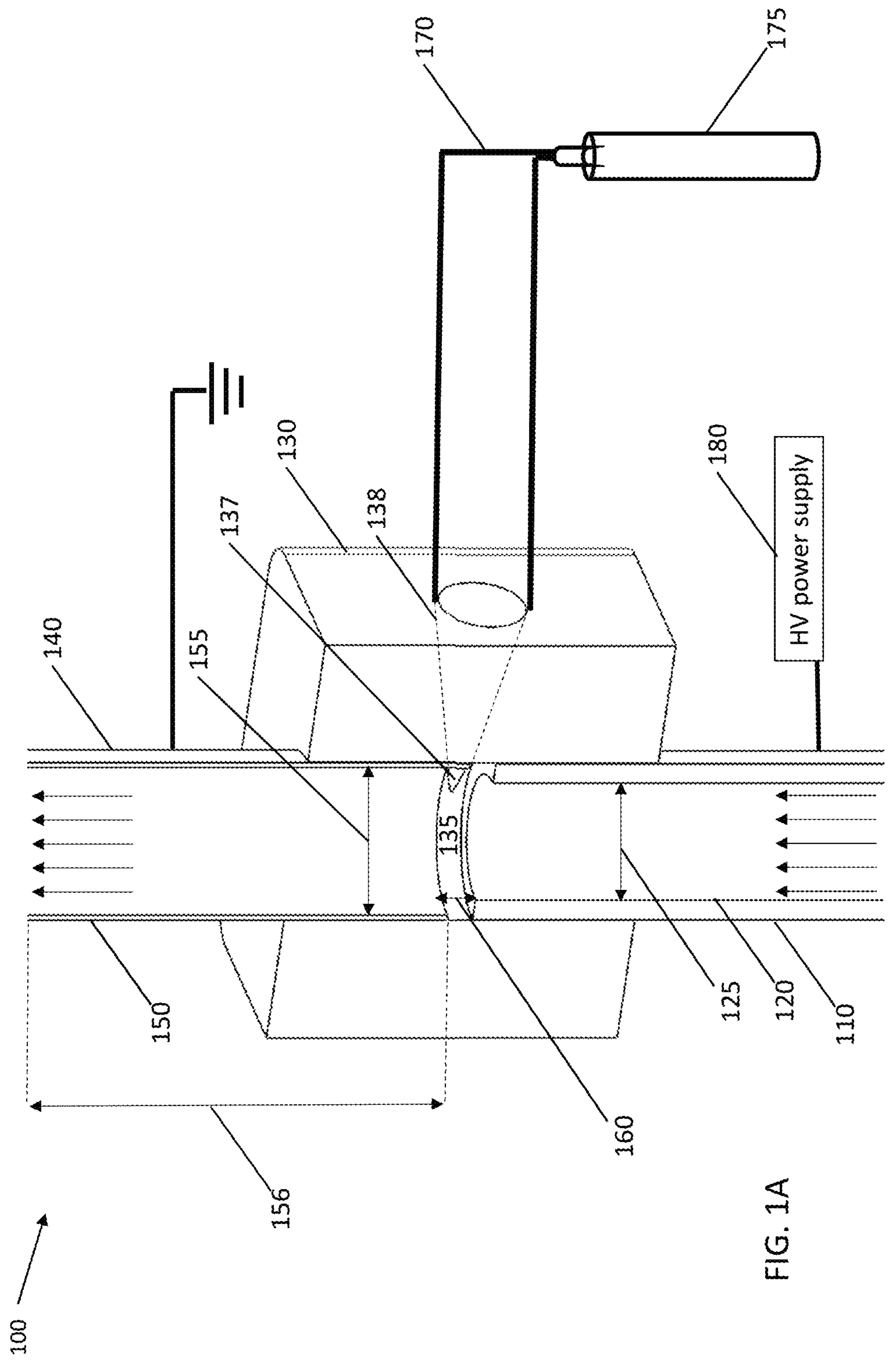
FIG. 1A is a simplified perspective cross-section view of a flow-through fluid treatment system in accordance with one or more embodiments.

The objective of the systems and methods described herein is to remove contaminants from various types of liquids, including groundwater, surface water, agriculture and drinking water, industrial or municipal wastewater, and industrial process water, and oxidize/reduce and destroy them without leaving any treatment gap or secondary waste problems. Various embodiments disclosed herein relate to methods and apparatus for fluid treatment with plasma discharges. In accordance with one or more embodiments, as shown in FIG. 1A, a flow-through fluid treatment system 100 includes a high-voltage electrode 110 forming a fluid inlet 120 into a cylindrical flow-through reactor 130, the fluid inlet 120 having an inlet inner diameter 125, a ground electrode 140 forming a fluid outlet 150 out of the cylindrical flow-through reactor 130, the fluid outlet 150 having an outlet inner diameter 155, and an axial length 156, the ground electrode 140 and the high-voltage electrode 110 disposed coaxially across a gap 160 between the electrodes 110 and 140 in a cylindrical flow-through reactor space 135. Alternatively, the ground electrode can form the fluid inlet, and the high-voltage electrode can form the fluid outlet (not shown). The fluid treatment system 100 further includes a gas inlet 170 into the cylindrical flow-through reactor 130, disposed tangentially through nozzle(s) 137 in an interior wall 138 of the cylindrical flow-through reactor 130 to generate a vortex gas flow within the cylindrical flow-through reactor space 135, thereby generating a negative gauge pressure within the fluid inlet 120. As shown in FIG. 1A, the gas inlet 170 is in fluid communication with a pressurized gas supply 175, or other source of pressurized gas, such as a compressor, as described further below. The flow-through fluid treatment system 100 further includes a high-voltage power supply 180 electrically connected to the high-voltage electrode 110 for generating a plasma discharge across the gap 160, thereby producing plasma treated fluid. In certain embodiments, the axial length 156 of the ground electrode 140 is about 7.6 cm (3"), or about 15.2 cm (6"). Longer axial lengths, such as about 30.5 cm (12"), or about 61 cm (24") or more are also contemplated. In some embodiments, the gap 160 can be in a range of between about 1 mm (0.04") and about 8 mm (0.3"), such as 5 mm (0.2"), 6.4 mm (0.25"), or 7.6 mm (0.3"). In certain embodiments, the outlet inner diameter 155 can be larger than the inlet inner diameter 125. In one example embodiment having an inlet inner diameter 125 of about 19 mm (0.75") and an outlet inner diameter 155 of about 23 mm (0.9"), as shown in Table 1, as the gas inlet pressure was increased from 5 psig to 30 psig, the negative gauge pressure within the fluid inlet 120 increased in absolute magnitude from −622.3 Pa to −2,364.7 Pa without plasma discharge, and from −124.5 Pa to −1, 1120.1 Pa with plasma discharge generated by 3 kilowatts (KW) of plasma power from the high-voltage power supply 180. The plasma power can be in a range of between about 500 W and about 10 KW or more, with adequate cooling. The gas (air) flow rate into the cylindrical flow-through reactor space 135 at each gas inlet pressure is also listed in Table 1.

TABLE 1

| Gas Inlet | | Fluid Inlet - without plasma discharge | Fluid Inlet - with plasma discharge |
|---|---|---|---|
| Pressure (psig) | Flowrate (CFM) | Pressure (Pa) (gauge) | Pressure (Pa) (gauge) |
| 5 | 4 | −622.3 | −124.5 |
| 10 | 5 | −995.7 | −248.9 |
| 15 | 5.5 | −1,244.6 | −373.4 |
| 20 | 6 | −1,618.0 | −622.3 |
| 25 | 6.75 | −1,991.4 | −560.1 |
| 30 | 7.25 | −2,364.7 | −1,120.1 |

Figure 1B:
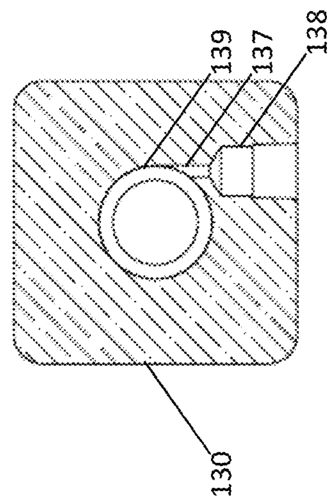
FIG. 1B is a simplified top-down view of a cylindrical flow-through reactor in accordance with one or more embodiments.
Figure 1C:
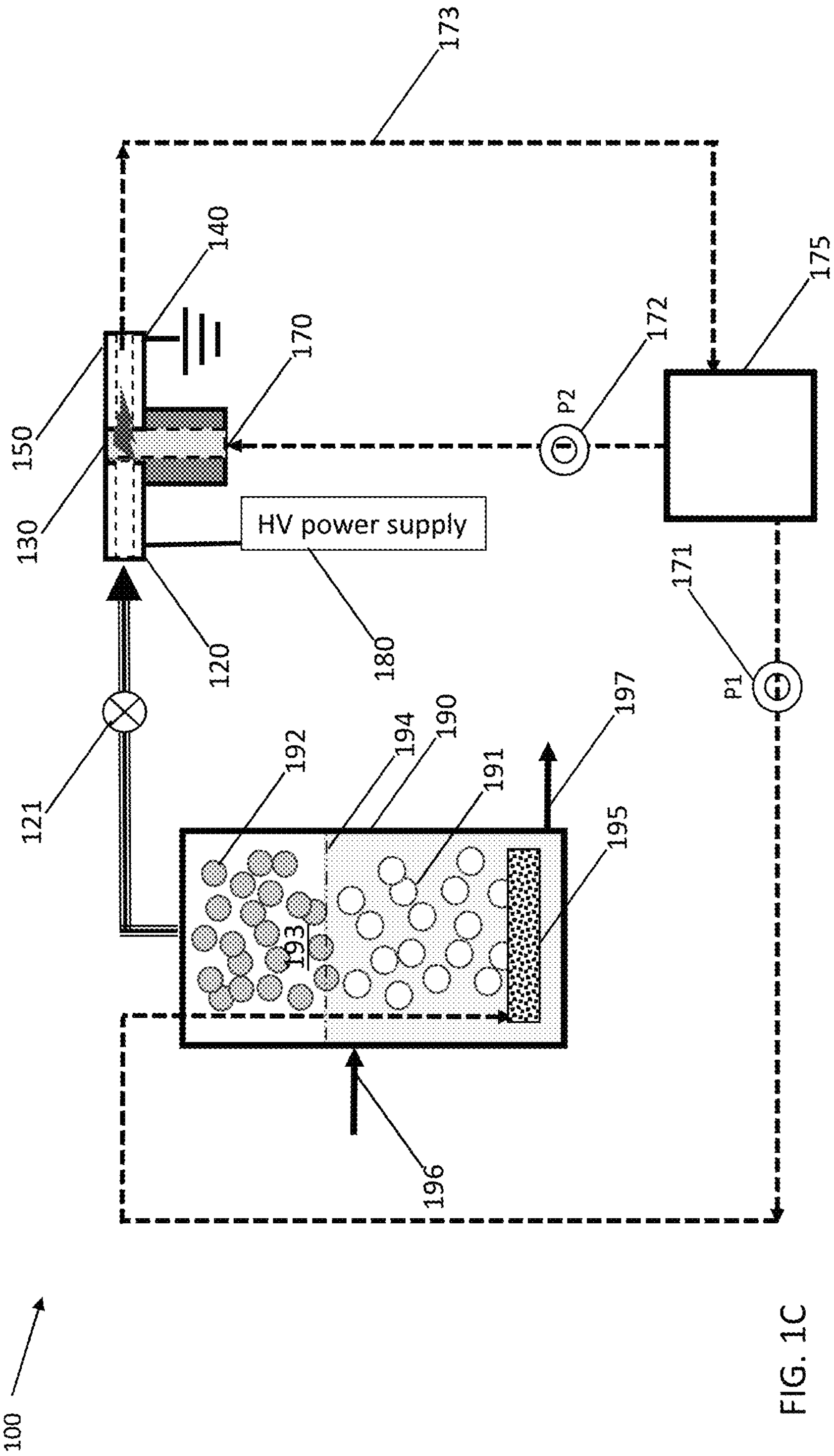
FIG. 1C is a schematic diagram of a flow-through fluid treatment system including a foam fractionation system in accordance with one or more embodiments.

In accordance with one or more embodiments, as shown in FIG. 1C, the flow-through fluid treatment system 100 optionally further includes a foam fractionation system 190 in fluid communication with the fluid inlet 120. Compressed gas is introduced at or near the bottom of a foam fractionation (FF) system 190. Foam fractionation systems typically incorporate venturis to inject large amounts of gas into water. Alternatively, as shown in FIG. 1C, in order to generate gas bubbles in water, a sparger 195 with porous walls can be used. The pore size varies in the range of 5-500 microns. The gas bubbles 191 generated at the bottom of the FF tank 190 rise in the FF tank 190. The bubble rising velocity is influenced by the bubble size, which can be determined by Stoke's law as:

$$U = \frac{(\rho_{water} - \rho_{air})\, d^2 g}{18\mu} \quad \text{Equation 1}$$

where U is the bubble rising velocity, $\rho_{water}$ and $\rho_{air}$ are the density of water and air, respectively, d is the bubble diameter, and u is the water viscosity.

As gas bubbles 191 rise in water, PFAS molecules from water are adsorbed on the surface of air bubbles. This is because PFAS behaves as a surfactant as a result of its hydrophobic tail and a hydrophilic head. The hydrophobic tail of a PFAS chemical is adsorbed to the surface of air bubbles, changing gas bubbles into concentrated PFAS-adsorbed foam 192. Foam typically rises through the water volume in the FF tank 190.

When compressed gas is employed to boost foam in the FF tank 190 on a continuous basis and foam fills the head space 193 in the FF tank 190, the pressure in the head space 193 eventually reaches pressure P1. Note that pressure regulator 171 is set to P1, whereas pressure regulator 172 is set to P2. P1 is greater than P2 by at least 1-5 psig. (Note: P1 also needs to be slightly larger than P2 for the optional gas recirculation 173 to compressor 175 shown in FIG. 1B).

At this point, valve 121 opens, allowing foam 192 to move from the head space 193 in FF tank 190 to a gliding arc reactor (GAR) 130. When there is little or no foam 192 in the head space 193 of the FF tank 190, valve 121 is closed.

As described above and shown in FIG. 1A, the GAR 130 consists of two electrodes: a circular-tube shape high-voltage electrode 110 and the other one a circular-tube shape ground electrode 140. Compressed gas tangentially enters GAR 130 through gas inlet 170. As shown in FIG. 1B, there is a cylindrical ring manifold 139 comprised of one, two, four or more separate nozzles 137 (only one nozzle 137 shown in FIGS. 1A and 1B for clarity) that distributes the compressed gas from the gas inlet 170 to the cylindrical gap 160, through the one, two, four, or more separate tangential nozzles 137 via the interior wall 138 of the reactor 130. As described above, the axial distance 160 between the two electrodes 110 and 140 is in the range of about 1 mm to about 8 mm, which is desired to ignite arc plasma and maintain the arc. The compressed gas pushes the arc as the gas enters the gap 160 in the tangential direction so that the arc glides along the circumferential edges of the two tube electrodes 110 and 140, providing cooling of the tube electrodes 110 and 140. When the valve 121 opens, the foam 192 from the FF tank 190 enters the tubular opening 120 at the high-voltage electrode 110 in the GAR 130, which is located at the center of the circular-tube shaped high-voltage electrode 110. The ground electrode 140 is the outlet pipe 150 for compressed gas and plasma-treated foam. The outlet pipe 150 of the GAR 130 connected to the ground electrode 140 is connected to the compressor 175, allowing the compressed gas 173 leaving the GAR 130 to return to the compressor 175. The GAR 130 utilizes compressed gas 172 that comes from the same compressor 175. However, the compressed gas 172 that enters the GAR 130 has pressure P2, which is lower than the pressure P1 by at least 1 to 5 psig. This is desired to cause foam 192 to enter the GAR 130 through the tubular high-voltage electrode 110.

The compressed gas 172 entering the GAR 130 through gas inlet 170 tangentially enters the circular-gap space 135 between the two tubular electrodes 110 and 140. As a plasma arc is discharged between the two electrodes 110 and 140, the compressed gas pushes the arc along the perimeter of the two tubular electrode edges 110 and 140. As the arc continuously glides along the circumferential direction, significant cooling takes place at the two tubular electrode edges, preventing both electrodes from overheating, burning or melting. The compressed gas 170 pushes a part of arc into the circular-tube ground electrode 140, which is connected to the outlet pipe 150 of GAR 130, stretching the arc along the flow direction of the compressed gas.

As shown in FIG. 1C, foam 192 can be produced in an FF system 190, where multiple gas bubbles 191 are introduced through various means into one or more FF vessels 190 such as venturis, spargers, microbubble generators, among other devices, near the bottom of an FF tank 190 that contains water with dissolved PFAS. Typically, water remains in an FF tank 190 for a period of time (i.e., 1 to 20 mins), and one or more FF tanks 190 can be employed in series to increase this foam fractionation residence time, while gas bubbles 191 are introduced at the bottom of FF tanks 190 as described above. The concentrated foam 192 that is pushed out over the top of the water level 194 is called foamate, which is a concentrated waste water generated from collapsed foam in the foam fractionation system 190, and the liquid that leaves the FF tank 190 from or near the bottom 197 of the vessel is called fractionate. See U.S. Pat. No. 11,358,103 B2 issued to Phillips et al., on Jun. 14, 2022. Multiple stages of foam fractionation can be used either on the foamate to increase the concentration of constituents or on the fractionate to increase purification and removal of constituents. Water enters the FF tank 190 near the upper part 196 of the FF tank 190 but below the head space 193. Water exits the FF tank 190 through an outlet pipe 197 located near the bottom of the FF tank 190. The volume flow rate of water determines the water falling velocity in the FF tank 190, which affects the gas bubble rising velocity. For example, if the gas bubble rising velocity, which is determined by Stoke's law as described above, is smaller than the water falling velocity, no gas bubbles will be able to rise to the top of FF tank 190. This will happen if the gas bubble size is too small. On the other hand, if the gas bubble size is too large, gas bubbles may break or rise too fast, reducing foaming or the contact time needed for PFAS adsorption on the bubble surface. Therefore, the gas bubble size should be optimized based on the water flow rate and the diameter of the FF tank 190 in a continuous operation. The goal of the optimization in a continuous operation is to provide at least 1-20 mins of contact time between water and gas bubbles in the FF tank 190.

Figure 2B:
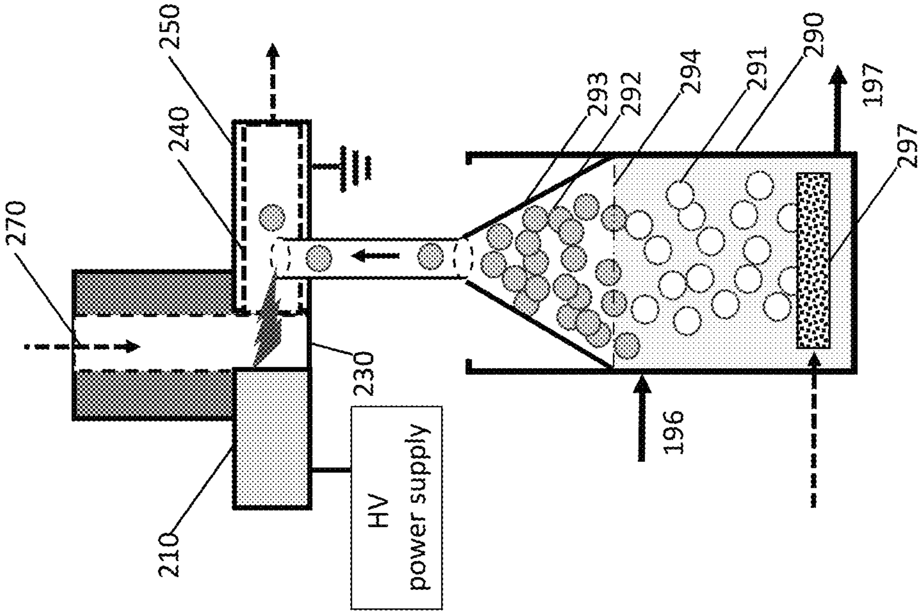
FIG. 2B is a schematic diagram of yet another flow-through fluid treatment system including a foam fractionation system in accordance with one or more embodiments.
Figure 2A:
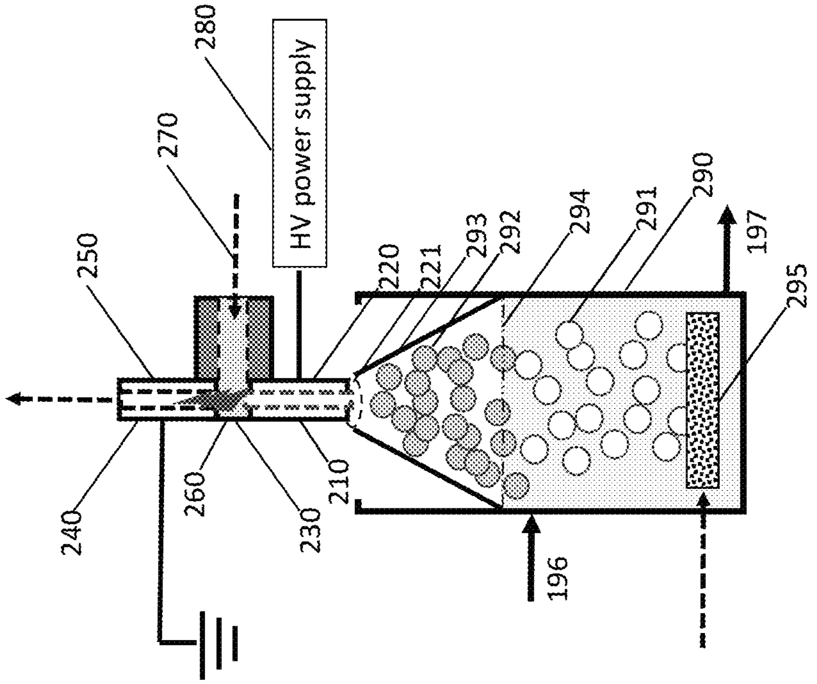
FIG. 2A is a schematic diagram of another flow-through fluid treatment system including a foam fractionation system in accordance with one or more embodiments.

In accordance with one or more embodiments, as shown in FIG. 2A, the foam fractionation (FF) system 290 optionally includes a sparger 295 through which compressed gas enters into the inner space of the sparger 295. The sparger 295 is made of a porous tubular wall with pore size in the range of 5-500 microns that produce bubbles 291. The FF tank 290 has a conical foam collection system 293 positioned above water body 294, which helps foam 292 to be collected and exit through a relatively small-diameter pipe 221 (conduit) located at the top of the FF tank 290. The GAR 230 is located at the top of the FF tank 290. The fluid inlet 220 is directly connected to the outlet pipe 221 of the FF tank 290 at the top of the FF tank 290. GAR 230 is used as an in-line device. Since the pressure at the fluid inlet 220 is negative (i.e., vacuum), foam 292 is drawn into the GAR 230 when the GAR is operating normally with compressed gas entering the GAR 230 through gas inlet 270. As described above, foam 292 passes through the gap 260 between the two tubular electrodes 210 and 240, where the plasma arc generated by the HV power supply 280 is continuously gliding along the tubular edges of the two electrodes, HV electrode 210 and ground electrode 240, pushed by the tangentially moving gas. Thus, foam 292 makes direct contact with the plasma arc. Of note is that the compressed gas pushes the gliding arc to the outlet 250 (i.e., the only outlet) which is the ground electrode 240. Metal tube or pipe walls have imperfections and surface roughness (both for copper, titanium, or stainless steel for instance), so the plasma arc can be accurately conceptualized as a very large number of small plasma arcs discharging on the inner wall surface of the ground electrode 240, rotating together with the exiting gas vortex flow. In one exemplary embodiment, the axial length of the outlet 250 that contains a large number of plasma arcs was approximately 2 inches (~5 cm), and the axial inner space of the outlet 250 was completely filled with plasma torch rotating with the gas vortex flow.

In another embodiment, as shown in FIG. 2B, a foam fractionation (FF) system 290 includes a microbubble generator (MBG) 297 at the bottom of FF tank 290 that produces bubbles 291 in a range of between about 50 μm and about 100 μm. Foam 292 rises and fills the conical foam collection system 293 in FF tank 290.

Figure 2C:
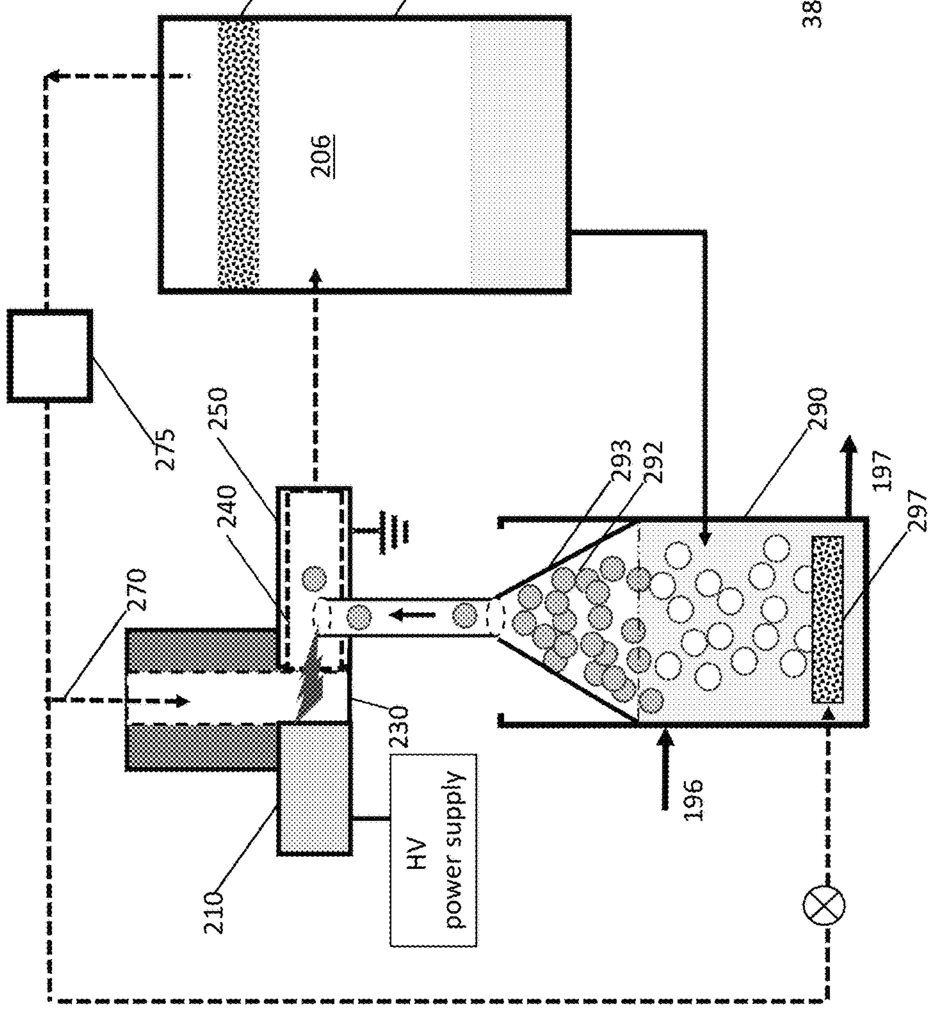
FIG. 2C is a schematic diagram of a flow-through fluid treatment system including foam fractionation in a closed-loop recirculation system in accordance with one or more embodiments.

As shown in FIG. 2C, foam 292 is sucked away from the conical foam collection system 293 to a foam-collection tank 205, where strong vacuum is constantly maintained by a scroll compressor 275.

The key idea is to utilize gas plasma 230 (i.e., gliding arc discharge, GAD) between the head space 293 in FF tank 290 and foam collection tank 205 such that foam 292 enters the outlet 250 of the ground electrode 240 in GAD 230, thus making direct contact with arc plasma, whereby PFAS molecules adsorbed on foam surface 292 are destroyed by solvated electrons and other active plasma species. As some foam is converted to liquid, it is collected at the bottom of foam-collection tank 205 and returns to FF tank 290 by gravity.

As also shown in FIG. 2C, the scroll compressor 275 injects compressed gas to GAD 230 through gas inlet 270 so that the compressed gas tangentially enters GAD 230, forcing plasma arc to glide along the circumferential edges of cylindrical-shape HV 210 and ground electrode 240.

Moisture-trapping membranes 207, such as a mesh with small pores, installed within head space 206 of the foam collection tank 205 upstream of scroll compressor 275, allow clean and dry gas to flow to GAD 230 through gas inlet 270. As the scroll compressor 275 continuously injects gas to both MBG 297 and GAD 230, foam 292 is continuously generated in FF tank 290, while PFAS molecules adsorbed on foam 292 are continuously destroyed in a closed-loop gas recirculation system.

Operating the FF tank 290 and GAD 230 in vacuum yields several advantages. First, the footprint of the entire system will be relatively small (e. g., 4 ft×6 ft). Second, the use of vacuum reduces the energy requirement for the complete PFAS mineralization to approximately 10,000 kWh/kg PFAS, a level of performance that is consistent with low and competitive operating and total costs for the PFAS destruction process, as the plasma breakdown voltage in vacuum will be significantly less compared to that at the atmospheric pressure according to the Paschen curve. As shown in FIG. 2C, argon gas can optionally be used in a closed-loop gas recirculation system to further reduce the plasma breakdown voltage compared to air and thereby further lowering the energy requirement for complete PFAS mineralization.

The PFAS destruction system described herein is built around a gliding arc discharge (GAD), which is a stable gas plasma as long as GAD operates with dry compressed gas. GAD is constructed with two coaxially positioned circular tubes: the inner tube with a smaller diameter is the high-voltage electrode, whereas the outer tube is the ground, through which compressed gas together with active plasma species exits. The axial gap between the two electrodes is maintained relatively small in a range of between about 1 mm and about 8 mm, for effective plasma breakdown. Compressed gas tangentially enters the cylindrical gap between the two electrodes, forcing plasma arc to glide along the perimeters of the two electrodes and thus minimizing electrode-overheating problem. When the arc is created between the HV and ground electrodes, the vortex gas flow in GAD pushes and stretches the arc by approximately one inch toward the exit of the ground electrode (i.e., the only outlet of gas).

As shown in FIGS. 2B and 2C, the injection of foam 292 to the ground electrode/outlet 240/250 so that foam 292 makes direct contact with arc 230 destroys PFAS molecules. One can consider several different foam injection methods the ground electrode/outlet 240/250 to ensure the effective foam-arc interaction. Since foam is water-based, the intense heat from arc plasma 230 helps foam to collapse to liquid in foam collection tank 205 and thus return to FF tank 290 by gravity. The FF tank 290 continuously generates PFAS-laden foam 292, which is destroyed by plasma arc 230, in a process which is stable and thus can be continued over an extended time if one can continuously convert foam to liquid.

The moisture-trapping membrane described herein effectively separates gas from foam. The separation performance of membranes depends on several parameters, including the pore size and material of membranes, the gas flowrate through the membrane, the number of membranes, etc.

As described above, in some embodiments, dry compressed gas is injected into the GAD. In some of these embodiments, the compressed gas containing PFAS-laden foam is injected with the use of a scroll compressor over several hours.

In an exemplary embodiment, a PFAS-destruction skid based on a foam and gas closed-loop recirculation system with no PFAS emission to the atmosphere has a footprint of 4 ft×6 ft with a 10-gallon-foam-fractionation water tank and a 20-gallon-foam-collection gas tank.

Figure 3:
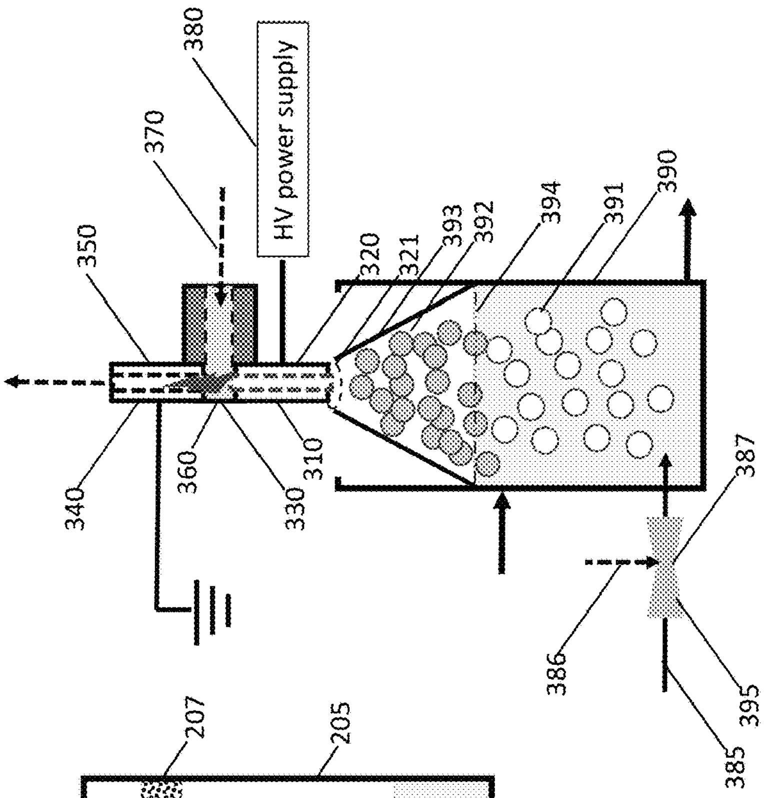
FIG. 3 is a schematic diagram of yet another flow-through fluid treatment system including a foam fractionation system in accordance with one or more embodiments.

In accordance with one or more embodiments, as shown in FIG. 3, a foam fractionation system (FF) system 390 optionally includes a venturi system 395 to introduce gas bubbles 391 to the FF tank 390. Water is pumped into the axially-positioned inlet 385 of the venturi 395, whereas a gas line 386 is connected from an open atmosphere to the throat 387, which has the small cross-sectional area for the generation of vacuum. Since the venturi system 395 introduces air from the open atmosphere, the pressure of gas bubbles 391 should be zero psig (gauge). Foam 392 is collected at the conical foam collection system 393 at the top of the FF tank 390, positioned above water body 394, which helps foam 392 to be collected and exit through a relatively small-diameter pipe 321 (conduit) located at the top of the FF tank 390. The GAR 330 is located at the top of the FF tank 390. The fluid inlet 320 is directly connected to the outlet 321 of the FF tank 390 at the top of the FF tank 390. GAR 330 is used as an in-line device. Since the pressure at the fluid inlet 320 is negative (i.e., vacuum), foam 392 is drawn into the GAR 330 when the GAR is operating normally with compressed gas entering the GAR 330 through gas inlet 370. As described above, foam 392 passes through the gap 360 between the two tubular electrodes 310 and 340, where the plasma arc generated by the HV power supply 380 is continuously gliding along the tubular edges of the two electrodes 310 and 340 pushed by the tangentially moving gas. Thus, foam 392 makes direct contact with the plasma arc. Note that the compressed gas pushes the gliding arc to the outlet 350 (i.e., the only outlet) which is the ground electrode 340. Because suction occurs down the length of the gliding arc reactor simultaneously with the ionization of gas injected at the central gap, this gliding arc reactor design can be integrated with foam fractionation systems, as shown in FIGS. 2 and 3, into a single system that provides both PFAS removal and PFAS destruction in a single stage of treatment.

In some embodiments, the fluid to be treated can be a liquid instead of a foam. For example, the liquid can be a leachate from a landfill containing contaminants, such as PFAS, polychlorinated biphenyls (PCBs), polychlorinated dibenzodioxins, other dioxins, etc. In certain of these embodiments, the liquid can include a surfactant, such as cetrimonium bromide (CTAB), hydroxypropyl methylcellulose (HPMC), or saponin, a plant-based biodegradable chemical for increasing foaming, or other such additives which increase the concentrations of contaminants in foamate.

Figure 4:
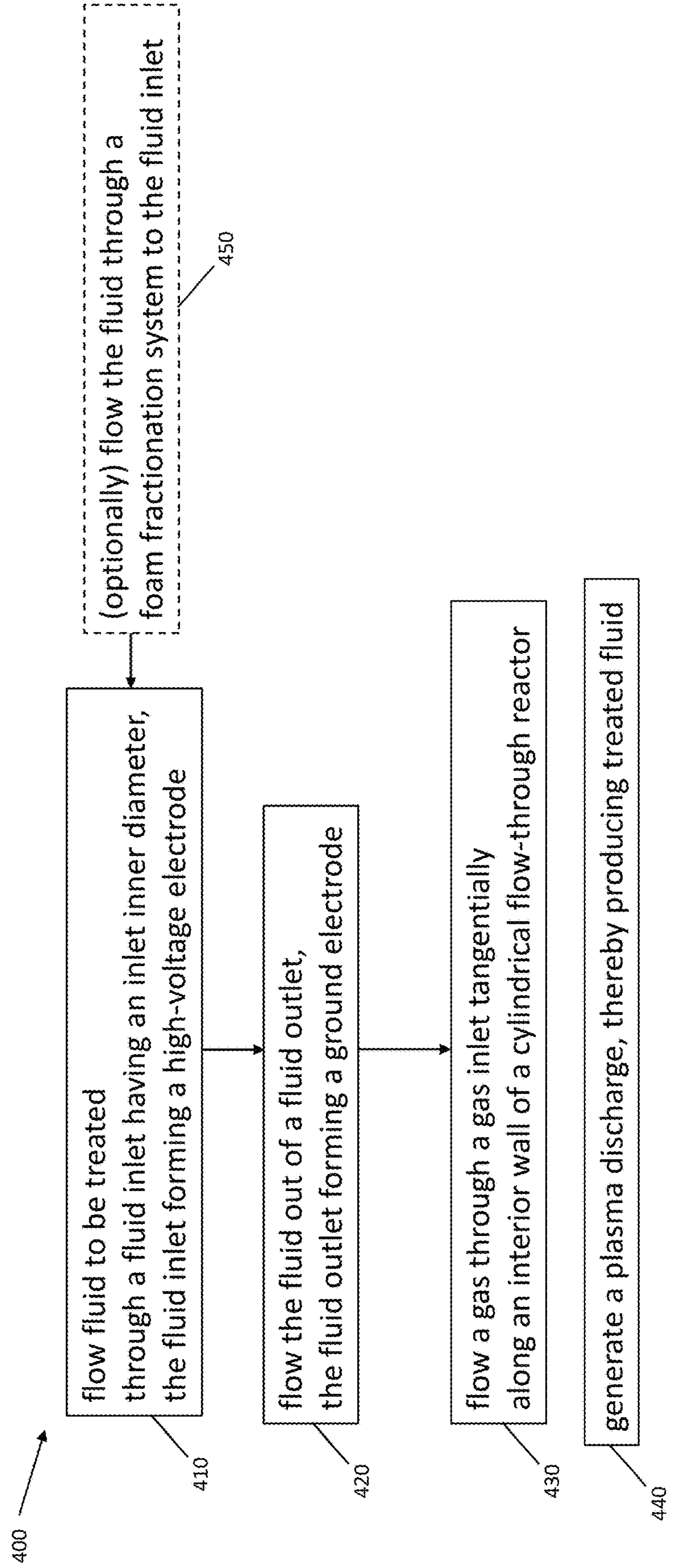
FIG. 4 is a flow chart of a method of plasma treating a fluid in accordance with one or more embodiments.

In accordance with one or more embodiments, as shown in FIG. 4, a method 400 of plasma treating fluid includes flowing 410 a fluid through a fluid inlet having an inlet inner diameter into a cylindrical flow-through reactor, the fluid inlet forming a high-voltage electrode, flowing 420 the fluid out of a fluid outlet, the fluid outlet forming a ground electrode disposed coaxially across a gap between the electrodes in a cylindrical flow-through reactor space. The method further includes flowing 430 a gas through a gas inlet into the cylindrical flow-through reactor tangentially along an interior wall of the cylindrical flow-through reactor, thereby generating a vortex gas flow within the cylindrical flow-through reactor space and a negative gauge pressure within the fluid inlet, and generating 440 a plasma discharge across the gap, thereby producing plasma treated fluid. In certain embodiments, the fluid outlet can have an outlet inner diameter that is larger than the inlet inner diameter. In some embodiments, the gap can be in a range of between about 1 mm and about 8 mm. In certain embodiments, the fluid can be a foam that is drawn into the cylindrical flow-through reactor by the negative pressure within the fluid inlet. In some of these embodiments, the method can further include flowing 450 the fluid through a foam fractionation system in fluid communication with the fluid inlet. In certain of these embodiments, the foam can comprise amphophilic compounds, such as per- and poly-fluoroalkyl substances (PFAS). In some embodiments, the fluid can be a liquid. In certain of these embodiments, the liquid can include a surfactant.

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention.

What is claimed is:

1. A flow-through fluid treatment system for generating a plasma discharge in a fluid, the system comprising:
- a high-voltage electrode forming a fluid inlet into a cylindrical flow-through reactor, the fluid inlet having an inlet inner diameter;
- a ground electrode forming a fluid outlet out of the cylindrical flow-through reactor, the ground electrode and the high-voltage electrode connected in series and disposed coaxially across a gap between the electrodes in a cylindrical flow-through reactor space;
- a gas inlet into the cylindrical flow-through reactor, disposed tangentially in an interior wall of the cylindrical flow-through reactor to generate a vortex gas flow within the cylindrical flow-through reactor space, thereby generating a negative gauge pressure within the fluid inlet; and
- a high-voltage power supply electrically connected to the high-voltage electrode for generating a plasma discharge across the gap, thereby producing plasma treated fluid.

2. The flow-through fluid treatment system of claim 1, wherein the fluid outlet has an outlet inner diameter that is larger than the inlet inner diameter.

3. The flow-through fluid treatment system of claim 1, wherein the gap is in a range of between about 1 mm and about 8 mm.

4. The flow-through fluid treatment system of claim 1, wherein the fluid is a foam.

5. The flow-through fluid treatment system of claim 4, further including a foam fractionation system in fluid communication with the fluid inlet.

6. The flow-through fluid treatment system of claim 4, wherein the foam comprises amphophilic compounds.

7. The flow-through fluid treatment system of claim 6, wherein the amphophilic compounds include perfluoroalkyl substances (PFAS).

8. The flow-through fluid treatment system of claim 1, wherein the fluid is a liquid.

9. The flow-through fluid treatment system of claim 8, wherein the liquid includes a surfactant.

10. A method of plasma treating fluid, the method comprising:
- flowing a fluid through a fluid inlet having an inlet inner diameter into a cylindrical flow-through reactor, the fluid inlet forming a high-voltage electrode;
- flowing the fluid out of a fluid outlet, the fluid outlet forming a ground electrode disposed coaxially across a gap between the electrodes in a cylindrical flow-through reactor space, wherein the high-voltage electrode and ground electrode are connected in series;
- flowing a gas through a gas inlet into the cylindrical flow-through reactor tangentially along an interior wall of the cylindrical flow-through reactor, thereby generating a vortex gas flow within the cylindrical flow-through reactor space and a negative gauge pressure within the fluid inlet; and
- generating a plasma discharge across the gap, thereby producing plasma treated fluid.

11. The method of claim 10, wherein the fluid outlet has an outlet inner diameter that is larger than the inlet inner diameter.

12. The method of claim 10, wherein the gap is in a range of between about 1 mm and about 8 mm.

13. The method of claim 10, wherein the fluid is a foam that is drawn into the cylindrical flow-through reactor by the negative pressure within the fluid inlet.

14. The method of claim 13, further including flowing the fluid through a foam fractionation system in fluid communication with the fluid inlet.

15. The method of claim 13, wherein the foam comprises amphophilic compounds.

16. The method of claim 15, wherein the amphophilic compounds include perfluoroalkyl substances (PFAS).

17. The method of claim 10, wherein the fluid is a liquid.

18. The method of claim 17, wherein the liquid includes a surfactant.

* * * * *